Figure 1:
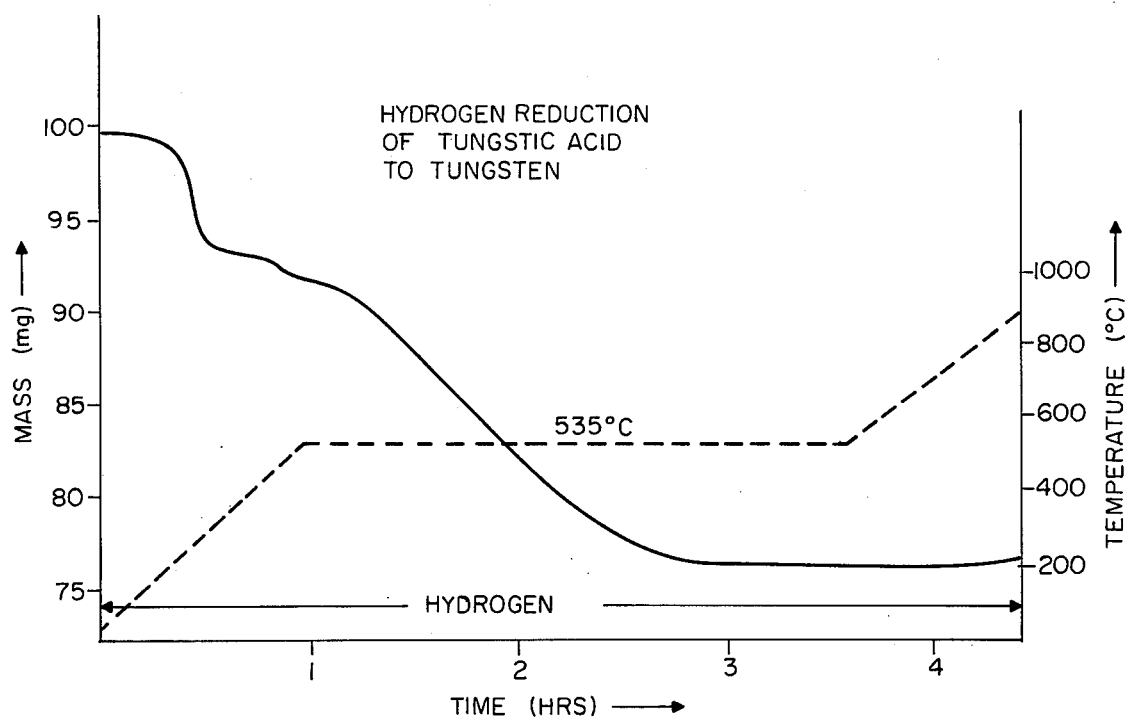

United States Patent [19]

Auborn et al.

[11] 4,115,526
[45] Sep. 19, 1978

[54] PROCESS FOR THE PREPARATION OF REACTIVE TUNGSTEN AND DERIVATIVES THEREOF

[75] Inventors: James J. Auborn, Warren, N.J.; Elizabeth A. Trickett, Acton, Mass.

[73] Assignee: GTE Laboratories Incorporated, Waltham, Mass.

[21] Appl. No.: 807,362

[22] Filed: Jun. 17, 1977

[51] Int. Cl.$^2$ .......................................... C01B 31/34
[52] U.S. Cl. .................................. 423/440; 423/409; 75/84
[58] Field of Search .............................. 423/409, 440; 75/0.5 BB, 84, 176; 106/43, 55

[56] References Cited

U.S. PATENT DOCUMENTS

| 985,386 | 2/1911 | Blau | 75/84 |
|---|---|---|---|
| 1,175,693 | 3/1916 | Bosch et al. | 75/84 |
| 1,278,580 | 10/1918 | Bosch et al. | 423/409 |
| 3,077,385 | 2/1963 | Robb | 423/440 |
| 3,850,614 | 11/1974 | Bleeker | 75/0.5 BB |

FOREIGN PATENT DOCUMENTS 1,011,166  11/1965  United Kingdom.

OTHER PUBLICATIONS

Mellor, *Supplement to Comp. Treatise on Inorg. & Theoretical Chem.*, vol. VIII, Supp. I, John Wiley & Sons, N.Y., 1964, p. 202.
Pascal, P. *Nouveau Traite de Chemie Minerale*, Masson et Cie, Paris, 1959, pp. 755–757.
Kirk–Othmer, *Encyclopedia of Chem. Tech.*, vol. 22, John Wiley & Sons, N.Y.
Mellor, *Comp. Treat. on Inorg. & Theoret. Chem.*, vol. XI, Longmans Green & Co., 1931, pp. 689–690.
Mah, "Bureau of Mines Report 6337", Dept. of Interior, 1963.
Hodgman, C. D., *Handbook of Chem. & Physics*, Chemical Rubber Pub. Co., Cleveland, Ohio, 32nd ed., 1950, p. 1889.

*Primary Examiner*—G. O. Peters
*Attorney, Agent, or Firm*—David M. Keay

[57] ABSTRACT

Process for the preparation of reactive tungsten comprising reducing a tungsten compound in a reducing atmosphere at temperatures ranging from about 450° C to 700° C. The reactive tungsten can be readily converted to WC, $W_2C$ or WN.

1 Claim, 4 Drawing Figures

PROCESS FOR THE PREPARATION OF REACTIVE TUNGSTEN AND DERIVATIVES THEREOF

This invention relates to a process for the preparation of reactive tungsten and derivatives thereof. More particularly, this invention relates to the production of ultrafine, highly-reactive tungsten by a low temperature reduction process and conversion thereof to tungsten carbides and nitrides.

Processes heretofore employed for the production of tungsten have generally involved extraction of tungsten from its ores, crystallization of sodium tungstate after purification from such extracts, conversion of the sodium tungstate to ammonium tungstate in solution by a liquid ion exchange process, crystallization of solid ammonium paratungstate from the solutions, thermal decomposition of ammonium paratungstate to tungstic oxide and careful reduction of the tungstic oxide to tungsten metal powder in a hydrogen furnace at temperatures on the order of about 900° C.

It has been shown that the principal morphological change occurring during conventional high temperature hydrogen reduction of tungstic oxide involves the conversion of blue $W_{20}O_{58}$ to whiskers of $W_{18}O_{49}$ and the subsequent reduction of these whiskers to $WO_2$, both steps of which require vapor phase transport of volatile tungsten species.

The tungsten metal so obtained has heretofore been converted to tungsten monocarbide (WC) or tungsten dicarbide ($W_2C$) by high temperature reaction with carbon. These processes have heretofore required careful control in order to achieve control over the particle size of the tungsten carbide produced. Small, uniform size tungsten carbide particles are desired for sintering with cobalt to achieve the uniform microstructure required for high strength cemented carbide tool materials. Tungsten carbide also exhibits potentially useful catalytic properties, such as for the cracking of ammonia, but must be manufactured as an ultrafine powder of high surface area for this application. The sustained high reaction temperatures required for carburization of tungsten by conventional means promotes rapid grain growth, placing a lower limit on the smallest tungsten particle size attainable. Moreover, tungsten carbide is too hard to economically grind to small particle sizes.

There are at present no processes available which lend themselves to the large scale production of tungsten nitride (WN).

Accordingly, it is an object of the present invention to provide a process for the manufacture of tungsten which enables the obtainment of ultrafine, highly-reactive tungsten powder in high yields and efficiency.

It is another object of the present invention to provide processes for the preparation of tungsten monocarbide and tungsten dicarbide exhibiting fine particle size and high surface area.

It is still a further object of the present invention to provide a process for the preparation of tungsten nitride.

These, as well as other objects, are accomplished by the present invention which provides a process for the preparation of reactive tungsten which comprises reducing a tungsten compound in a reducing atmosphere at a temperature between about 450° to 700° C.

Figure 4:
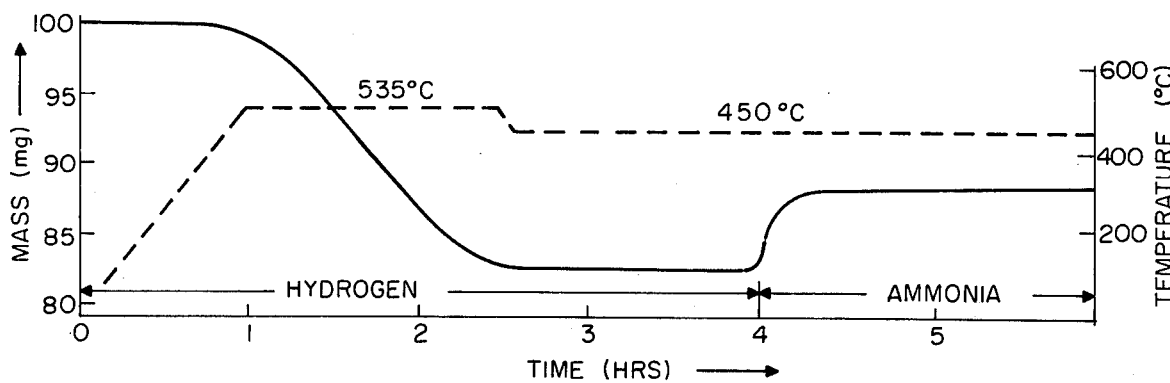
Figure 2:
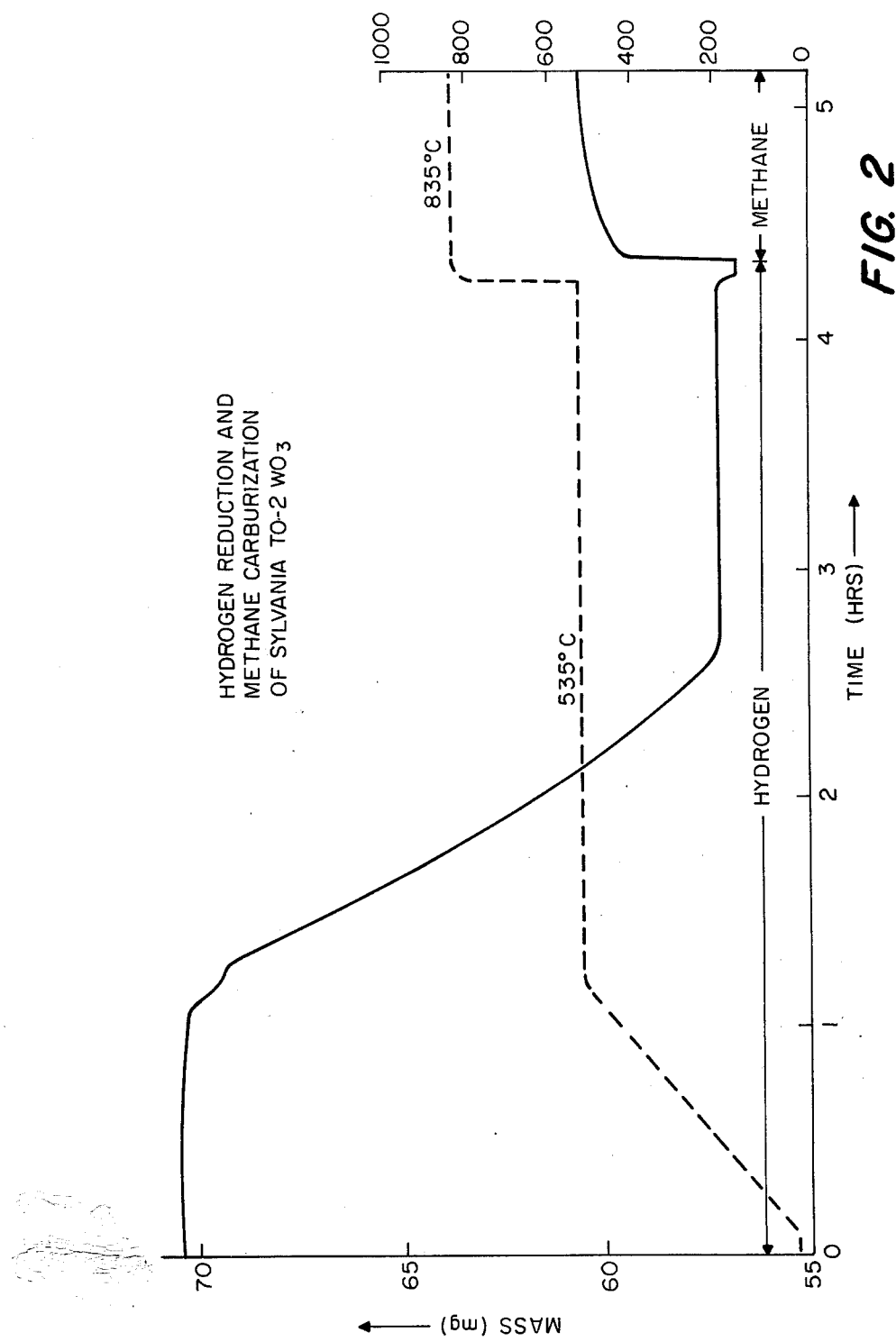
Figure 3:
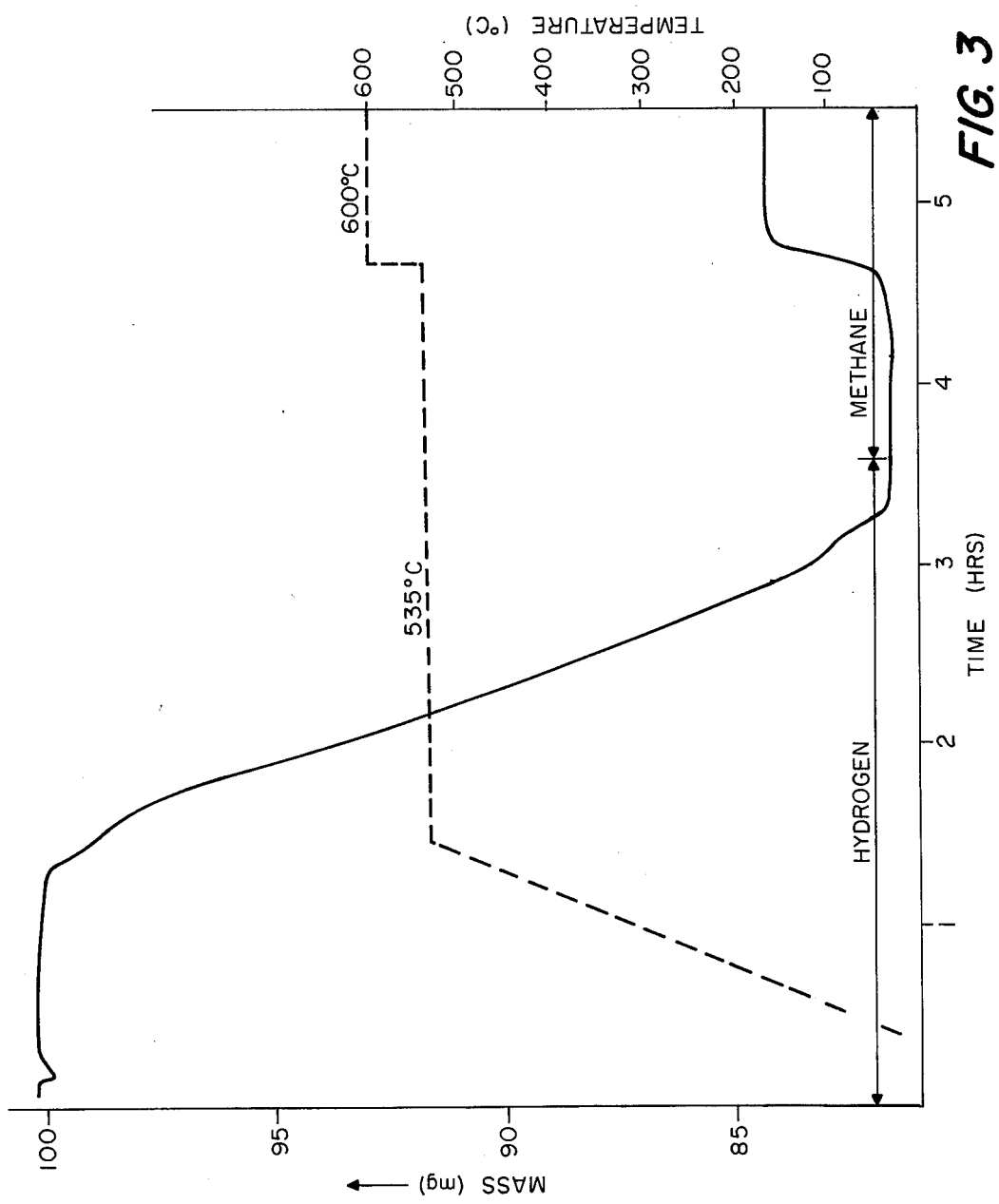

The present invention will become more apparent upon consideration of the ensuing discussion taken in light of the appended drawing wherein:

FIG. 1 graphically illustrates the hydrogen reduction of tungstic acid to reactive tungsten and the subsequent stabilization thereof;

FIG. 2 graphically illustrates the hydrogen reduction and methane carburization of $WO_3$ to WC;

FIG. 3 graphically illustrates the hydrogen reduction and methane carburization of $WO_3$ to $W_2C$; and FIG. 4 graphically illustrates the hydrogen reduction and ammonia nitriding of $WO_3$ to WN.

For a better understanding of the present invention, together with other and further objects, advantages and capabilities thereof, reference is made to the following disclosure and appended claims in connection with the above-described drawing.

In accordance with the present invention, ultrafine, highly-reactive tungsten powder is obtained by reduction of tungsten compounds in a reducing atmosphere such as hydrogen at temperatures ranging from about 450° C. to 700° C., and preferably from about 485° C. to 585° C. The reactive tungsten thus produced is pyrophoric in air, but it can be stabilized by further heating to 900° C. in the reducing atmosphere. Tungsten, thus stabilized, cannot be completely carburized at 835° C. as can its pyrophoric precursor.

Tungsten compounds which can be reduced to tungsten in accordance with the present invention include freeze-dried and other forms of ammonium tungstate, ammonium metatungstate, ammonium paratungstate, tungstic acid and tungstic oxide.

The tungsten compounds are preferably reduced in a hydrogen atmosphere at temperatures ranging from about 485° C. to about 585° C.

The high temperature reduction of tungstic oxide to tungsten (at temperatures on the order of about 900° C. heretofore employed a conversion of blue $W_{20}O_{58}$ to whiskers of $W_{18}O_{49}$ and a subsequent reduction of these whiskers to $WO_2$. It has been shown that the $W_{18}O_{49}$ whisker phase is formed only at temperatures above 585° C. The process of the present invention which effects reduction at temperatures between 485° C. to 585° C. proceeds without going through the $W_{18}O_{49}$ phase and therefore the morphology of the starting material is retained throughout reduction thereby enabling the obtainment of reactive tungsten exhibiting very fine particle size.

The reactive tungsten powders produced by hydrogen reduction in accordance with the present invention can be conveniently carburized with methane at temperatures of from about 485° C. to 585° C. to obtain tungsten dicarbides ($W_2C$) and at temperatures ranging from about 800° C. to 835° C. to obtain tungsten monocarbide (WC). Surprisingly, tungsten reduced at the higher temperatures heretofore employed (about 900° C.) cannot be carburized with methane at these temperatures.

As described hereinabove, the reactive tungsten obtained in accordance with the present invention is pyrophoric if merely cooled down to ambient temperature and exposed to atmospheric oxygen, but can be stabilized by continued heating after low temperature reduction to 900° C. in a reducing atmosphere where a 1 to 2% further reduction occurs.

Broadly speaking, decomposition of the tungsten compound commences at about 450° C. regardless of the environment. The compound decomposes $W_{20}O_{58}$ or mixtures of $WO_3$ and $W_{20}O_{58}$ whether the compound is by itself or mixed with carbon. Decomposition is effected at this temperature whether in vacuum, air, hydrogen or methane. At temperatures between 450° C. and 500° C., the compound starts reducing in a hydrogen atmosphere. If a 5° C./minute heat-up rate is employed and continues until hydrogen reduction is complete, complete conversion to metallic tungsten is effected at temperatures of about 700° C. If, however, the temperature is held at intermediate values, hydrogen reduction can be essentially completed in about 10 hours at 500° C. or in 2 hours at 535° C. Very slow hydrogen reduction is detectable at 485° C.; whereas, essentially no reduction is effected at 450° C. Although complete conversion to metallic tungsten can be effected at temperatures of about 700° C., it has been found that if the temperature is maintained below about 585° C., the formation of $W_{18}O_{49}$ whiskers is avoided thereby enabling retention of a fine particle size material throughout the reduction process. The finely-divided tungsten metal powders obtained in accordance with the present invention are pyrophoric and highly-reactive immediately after reduction, if care is taken to avoid exposure to the atmosphere. The highly-reactive tungsten powders obtained in accordance with the present invention retain the initial structure and particle size of the tungsten compound employed.

It has been found that the reactive tungsten powders obtained in accordance with the present invention can be immediately carburized in a four percent methane-in-hydrogen mixture to obtain either tungsten monocarbide or tungsten dicarbide by control of the carburization temperature. Thus, if carburization is effected at temperatures ranging from about 485° C. to about 600° C. and preferably from about 485° C. to about 585° C., tungsten dicarbide is obtained; whereas, if carburization is effected at temperatures ranging from about 800° C. to 835° C., tungsten monocarbide is obtained. Although tungsten dicarbide is formed more rapidly at 835° C., there is no stabilization step available which would enable the obtainment of tungsten dicarbide free of tungsten monocarbide.

It has also been found that the reactive tungsten metal powders obtained in accordance with the present invention are not reactive towards nitrogen at temperatures ranging from about 25° C. to 900° C. It has been found, however, that this highly reactive tungsten metal can be nitrided with anhydrous ammonia at temperatures ranging from about 250° C. to about 500° C. At temperatures above 500° C., the tungsten nitride starts to decompose with decomposition to metallic tungsten being complete at 900° C. The metallic tungsten resulting from thermal decomposition of the nitride is no longer reactive towards ammonia at lower temperatures.

The following examples further illustrate the present invention. These examples are for illustrative purposes only and are not to be construed as imposing any limitation upon the spirit or scope of the present invention. Unless otherwise stated all percentages and parts are by weight.

In each of the following examples, 50 to 100 mg. of sample were employed. A Cahn balance thermal gravimetric analysis apparatus was initially evacuated to remove all air and dry the sample charged thereto. The apparatus was then filled with hydrogen at atmospheric pressure and the hydrogen flow was adjusted to 100 $cm^3$/min. A 10° C. to 20° C./min heating rate was employed.

The standard procedure employed was to raise the temperature within the apparatus to 535° C. and hold at that temperature until the sample weight stabilized. This weight was close to that calculated to be the tungsten content of the sample. Typically, a further 1% to 2% reduction was observed by a small additional weight loss in instances wherein the sample was further heated to 835° C. in a hydrogen atmosphere in preparation for carburization. This new weight is used as the weight of tungsten present in determining at what weight carburization to $W_2C$ or WC is complete. Once the sample weight stabilizes at 535° C., the temperature can be raised or lowered depending upon the desired end product. Once the new temperature is attained, the hydrogen flow can be terminated and methane, methane diluted with hydrogen, or anhydrous ammonia, as set forth hereinbelow can be introduced, typically at a rate of 100 $cm^3$/min. Rapid reaction, as indicated by increase in weight, is initially readily apparent, but typically, the reaction slows down so that total carburization time, for example, to WC for a 70 mg. sample is 50 minutes.

In order to reduce free carbon formation, the carburizing gas, methane, can be diluted with hydrogen in concentrations calculated to stabilize the gas mixtures at desired operating temperatures; e.g. 4% methane in hydrogen at 835° C.

After completion of the reaction, the apparatus is flushed with an inert gas such as argon at room temperature prior to removal of samples for analysis.

The resulting samples were analyzed by X-ray diffraction. Scanning electron micrographs were taken to yield particle size and morphology information.

EXAMPLE I

Reference is made to FIG. 1 wherein it is shown that about 100 mg. of tungstic acid were reduced to reactive, stabilized tungsten by heating at 535° C. in a hydrogen atmosphere until the sample weight stabilized and then heating was continued to 900° C. in the presence of hydrogen. In this manner, about 77 mg. of reactive, stabilized tungsten were obtained.

EXAMPLES II to V

Reference is made to FIG. 2 wherein it is shown that about 70.5 mg. of $WO_3$ were converted to WC by heating at 535° C. in a hydrogen atmosphere until the sample weight stabilized. Thereafter, the temperature was raised to 835° C. and once the temperature stabilized, the hydrogen flow was terminated and methane at 100 $cm^3$/min. was introduced. A rapid weight gain was noted resulting in the obtainment of 60 mg. of WC after about 5 hours.

In the identical manner, freeze-dried ammonium tungstate, ammonium paratungstate and ammonium metatungstate were each converted to WC.

EXAMPLE VI

Reference is made to FIG. 3 wherein it is shown that about 100 mg. of $WO_3$ were converted to $W_2C$ by heating at 535° C. in a hydrogen atmosphere until the sample weight stabilized. Thereafter, the hydrogen flow was terminated and methane at 100 $cm^3$/min. was introduced. About an hour later, the temperature was raised to 600° C. whereupon a rapid weight gain was noted resulting in the obtainment of about 84 mg. of $W_2C$.

EXAMPLE VII

Reference is made to FIG. 4 wherein it is shown that about 100 mg. of $WO_3$ were converted to WN by heating at 535° C. in a hydrogen atmosphere until the sample weight stabilized. Thereafter, the temperature was reduced to 450° C. and once the temperature stabilized, the hydrogen flow was terminated and anhydrous ammonia was introduced. Nitriding was noted immediately. In this manner, about 87 mg. of WN were obtained.

In all instances, the reaction is allowed to proceed until the sample weight stabilizes at that weight of product stoichiometrically calculated to be formed from the weight of reactive tungsten formed during the reduction phase.

While there has been shown and described what is at present considered the preferred embodiments of the invention, it will be obvious to those skilled in the a that various changes and modifications may be mad therein without departing from the scope of the invei tion as defined by the appended claims.

What is claimed is:

1. A continuous process of preparing binary con pounds of tungsten and carbon comprising the steps c
   reducing an oxygen-containing tungsten compoun by heating said compound in a hydrogen-contair ing atmosphere at temperatures ranging from abou 485° C. to about 585° C., and
   carburizing the resultant material in a methane-con taining atmosphere at temperatures in the rang from about 485° C. to about 600° C.
whereby there is produced finely divided ditungstei carbide ($W_2C$).

* * * * *